(12) United States Patent
Jennings et al.

(10) Patent No.: US 7,686,342 B2
(45) Date of Patent: Mar. 30, 2010

(54) PIPE CONNECTOR AND TORQUE TOOL

(75) Inventors: Charles E. Jennings, Houston, TX (US); Brian N. Munk, Houston, TX (US)

(73) Assignee: Vetco Gray Inc., Houston, TX (US)

( * ) Notice: Subject to any disclaimer, the term of this patent is extended or adjusted under 35 U.S.C. 154(b) by 601 days.

(21) Appl. No.: 11/639,922

(22) Filed: Dec. 15, 2006

(65) Prior Publication Data

US 2007/0152441 A1 Jul. 5, 2007

Related U.S. Application Data

(60) Provisional application No. 60/751,187, filed on Dec. 16, 2005.

(51) Int. Cl.
*F16L 35/00* (2006.01)
(52) U.S. Cl. .................. 285/39; 285/323; 285/389; 285/912
(58) Field of Classification Search ............ 285/34, 285/35, 39, 86, 92, 308, 309, 322, 323, 389, 285/912, 920; 166/77.51, 78.1, 339, 344, 166/345, 350, 357, 359; 175/195; 403/45, 403/48, 118
See application file for complete search history.

(56) References Cited

U.S. PATENT DOCUMENTS

| | | | | | |
|---|---|---|---|---|---|
| 631,820 | A | * | 8/1899 | Rhind ........................ 285/39 |
| 1,653,137 | A | * | 12/1927 | Trumble ..................... 220/210 |
| 1,831,956 | A | * | 11/1931 | Harrington .................. 277/326 |
| 2,795,985 | A | * | 6/1957 | Wilson ....................... 81/57.15 |
| 2,907,242 | A | * | 10/1959 | Chakroff ..................... 81/57.15 |
| 3,026,128 | A | * | 3/1962 | Willis ......................... 285/18 |
| 3,353,847 | A | * | 11/1967 | Brown ......................... 285/18 |
| 4,040,650 | A | * | 8/1977 | Shotbolt ...................... 285/18 |
| 4,402,533 | A | * | 9/1983 | Ortloff ........................ 285/18 |
| 4,423,774 | A | * | 1/1984 | Mefford ..................... 166/77.51 |
| 4,433,859 | A | | 2/1984 | Driver et al. |
| 4,754,820 | A | * | 7/1988 | Watts et al. ................. 175/195 |
| 4,902,044 | A | | 2/1990 | Williams et al. |
| 4,914,987 | A | * | 4/1990 | Isler .......................... 81/57.46 |
| 5,058,929 | A | * | 10/1991 | Zentner et al. ............... 285/39 |

(Continued)

OTHER PUBLICATIONS 1980-1981, Regan Offshore International, Inc., Torrance, California, cover page, index page, page showing Type FCF Buoyant Riser (total of 3 pages.).

(Continued)

*Primary Examiner*—Michael P Ferguson
*Assistant Examiner*—Jay R Ripley
(74) *Attorney, Agent, or Firm*—Bracewell & Giuliani (57) ABSTRACT

A connection system for connecting tubular members to each other includes a rotatable connector sleeve on one of the tubular members. A make-up tool has a curved rack of gear teeth that are engagable with the connector sleeve for causing rotation of the connector sleeve in unison with the rack. The make-up tool includes a power tool having a drive motor that rotates a drive shaft. A pinion gear mounted on the drive shaft engages the teeth of the rack to cause the rack to move in a rotational direction when the drive shaft is rotated. This movement causes the connector sleeve to rotate to make-up or break-out the connection.

13 Claims, 5 Drawing Sheets

U.S. PATENT DOCUMENTS

| | | | | |
|---|---|---|---|---|
| 5,172,612 | A * | 12/1992 | Hansson | 81/57.13 |
| 5,433,274 | A | 7/1995 | Graff et al. | |
| 6,035,938 | A | 3/2000 | Watkins | |
| 6,129,149 | A | 10/2000 | Beall | |
| 6,237,964 | B1 * | 5/2001 | Østergaard | 285/85 |
| 6,254,147 | B1 * | 7/2001 | Edwards | 285/334.4 |
| 6,321,843 | B2 * | 11/2001 | Baker | 166/344 |
| 6,328,343 | B1 | 12/2001 | Hosie et al. | |
| 6,330,918 | B1 | 12/2001 | Hosie et al. | |
| 6,385,837 | B1 * | 5/2002 | Murakami et al. | 29/407.02 |
| 6,640,892 | B1 * | 11/2003 | Wright | 166/78.1 |
| 6,676,168 | B2 * | 1/2004 | McAliley | 285/206 |
| 7,077,436 | B1 * | 7/2006 | Krywitsky | 285/354 |

OTHER PUBLICATIONS

Vetco Gray, Drawing No. H113177, dated Apr. 30, 1996 of Connector-Wellhead.

Vetco General Catalog 1986-1987, Combustion Engineering, illustrations of Marine Riser Connectors and Connector Features.

Hughes Offshore Catalog 1986-1987, FC-8, FD-8 Drilling Riser.

* cited by examiner

PIPE CONNECTOR AND TORQUE TOOL

CROSS-REFERENCE TO RELATED APPLICATION

This application claims priority to provisional application 60/751,187, filed Dec. 16, 2005.

FIELD OF THE INVENTION

This invention relates in general to connecting tubular members by rotating a ring while the tubular members are held stationary.

BACKGROUND OF THE INVENTION

In oil and gas well drilling operations, it is normally necessary to make-up and breakout strings of pipe. Particularly, in offshore drilling operations in deep water, the operator will perform drilling operations through a drilling riser. The drilling riser extends between the subsea wellhead assembly at the seafloor and the drilling vessel. The drilling riser is made up of a number of individual joints or sections. These sections are secured to each other and run from a riser deploying floor. The drilling riser also normally has a number of auxiliary conduits that extend around and alongside the main central pipe. The auxiliary conduits comprise choke and kill lines and also hydraulic lines that supply hydraulic fluid pressure to the subsea blowout preventer and lower marine riser package. A recent type of drilling riser does not require auxiliary lines spaced around it. That type of drilling riser is built to withstand high pressure, and the blowout preventer is located on the drilling rig.

The central pipe of a drilling riser joint has a pin member on one end and a box member on the other end. The pin of one riser joint stabs into the box of the next riser joint. In one type of riser joint, flanges extend outward from the pin and box. The operator connects the flanges together with a number of bolts spaced around the circumference of the coupling. In another type of riser, individual dogs or locking segments are spaced around the circumference of the box. A screw is connected to each locking segment. Rotating the screw causes the locking segment to advance into engagement with a profile formed on the end of a pin.

In these systems, a riser spider or support on a riser deploying floor moves between a retracted position into an engaged position to support previously made-up riser joints while the new riser joint is being stabbed into engagement with the string. Wave movement can cause the vessel to be moving upward and downward relative to the riser.

In both types of risers, workers use wrenches to make up the bolts or screws. Personnel employed to secure the screws or the bolts are exposed to a risk of injury. Also, making up the individual bolts is time consuming. Often when moving the drilling rig from one location to another, the riser has to be pulled and stored. In very deep water, pulling and re-running the riser is very expensive. At least one automated system is shown in U.S. Pat. No. 6,330,918 for making up riser locking segment screws.

SUMMARY OF THE INVENTION

The connection system of this invention is operable with a tubular string wherein one of the tubular members has a rotatable sleeve that causes the tubular members to make up or break out. The connection system includes a make-up tool having a rack of gear teeth, the rack being curved about a center point. An engagement arrangement between the rack and the connector sleeve releasably couples the rack to the connector sleeve so that rotational movement of the rack causes rotation of the connector sleeve.

A power tool has a drive gear that is in engagement with the gear teeth of the rack to cause the rack to move in a rotational direction when the drive shaft is rotated. This rotational movement rotates the connector sleeve to secure the tubular members to each other. In the preferred embodiment, a retainer arrangement between the power tool and the rack retains the rack with the power tool. The rack is slidable relative to power tool when the gear is rotating.

DETAILED DESCRIPTION OF THE INVENTION

Figure 1:
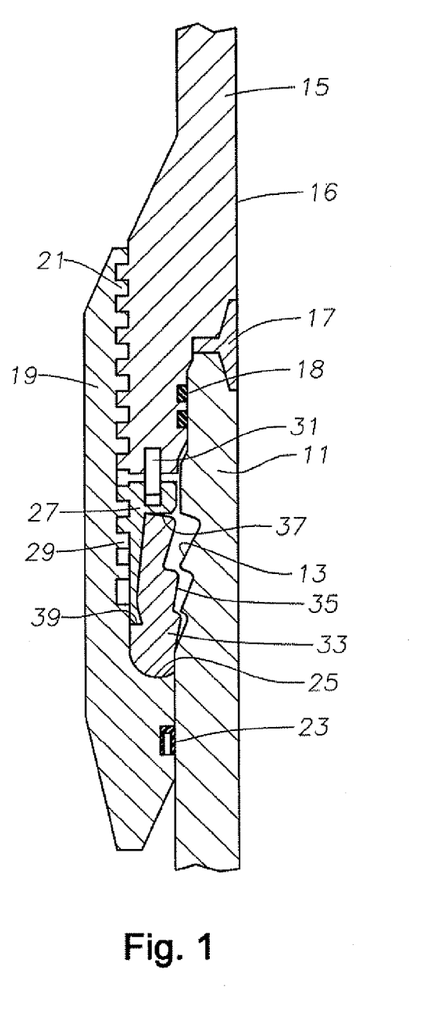
FIG. 1 is a quarter sectional view of a connector for tubular members in accordance with this invention and shown in an unlocked position.

Referring to FIG. 1, a tubular pin member 11 has a grooved profile 13 on its exterior. In this embodiment, profile 13 comprises three ramp sections, providing a saw-tooth profile in cross section. Pin 11 connects to a box member 15. A gasket 17 at internal mating portions of pin 11 and box 15 seals an internal passage 16 extending through pin 11 and box 15. Box 15 has a socket portion that swallows or extends over the upper end of pin 11. Seals 18 on the inner diameter of box 15 seal to the outer diameter of pin 11 near the upper end of pin 11.

A connector sleeve 19 is rotatably carried on and forms part of box 15. Connector sleeve 19 has a set of box or upper threads 21 on its inner side that engage mating threads on the outer diameter of box 15. Connector sleeve 19 extends downward and has a lower portion that is spaced closely to the outer diameter of pin 11 below profile 13. A seal 23 on the inner diameter of box 15 seals to the outer diameter of pin 11 near the lower end of box 15. Ring 19 has an internal recess 25 that is arcuate or concave at its lower end.

A retainer ring 27, preferably a split ring, locates within recess 25. Retainer ring 27 has a set of threads on its outer diameter that engage a set of lower or retainer threads 29 located in recess in the inner diameter of connector sleeve 19. Retainer threads 29 have a greater pitch than box threads 21. An anti-rotation pin 31 prevents rotation of retainer ring 27 relative to box 15. The difference in the pitch of threads 21 and 29 causes retainer ring 27 to move a greater distance axially than connector sleeve 19 for an increment of rotation. Box threads 21 and retainer threads 29 are preferably multi-start but could be single-start.

A lock ring 33 is carried in the inner diameter of retainer ring 27. Lock ring 33 is preferably a collet member, having alternating slots extending from its upper and lower edges (not shown) to provide flexibility. Lock ring 33 has a profile 35 on its inner diameter that matches profile 13 and is inwardly biased toward profile 13. Initially, retainer ring 27 holds lock ring 33 in an unlocked or retracted position as illustrated in FIG. 1. Retainer ring 27 has an overhanging ledge 37 that is inclined downwardly to engage and retain the upper end of lock ring 33. Lock ring 33 has an upward facing shoulder 39 on its outer diameter that is engaged by the lower edge of retaining ring 27. An internal lower portion of retaining ring 27 is tapered downward and inward to match the configuration on the outer diameter of lock ring 33.

Figure 2:
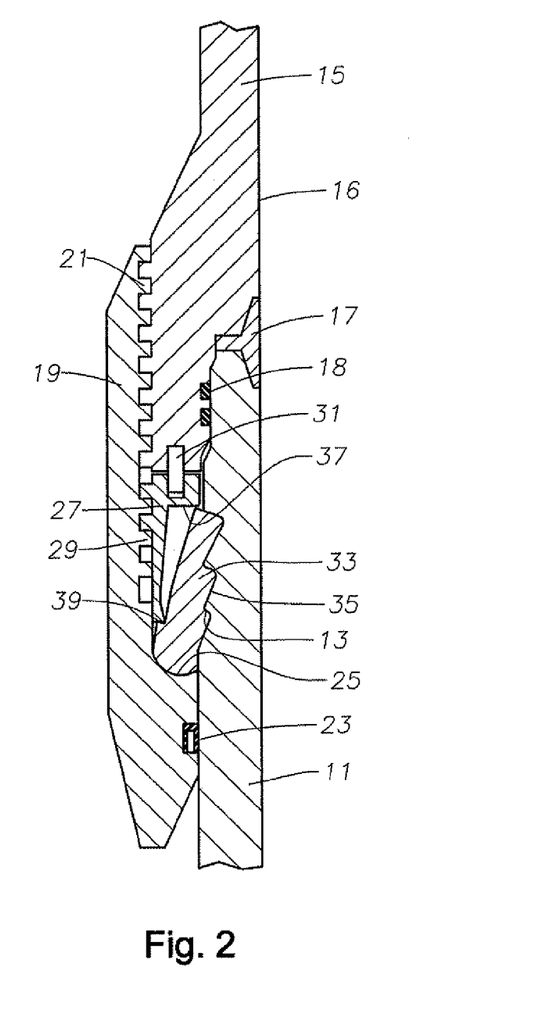
FIG. 2 is a sectional view of the connector of FIG. 1 shown in a locked position.

Upward movement of retainer ring 27 relative to lock ring 33 frees lock ring 33 to pivot inward to the locked position of FIG. 2. Continued rotation of connector sleeve 19 after the locked position of FIG. 2 will cause a preload force to extend from connector sleeve 19, through lock ring 33 and into pin 11. Preferably the amount of rotation of connector sleeve 19 required to go from the unlocked to the locked position is less than one full turn.

Figure 3:
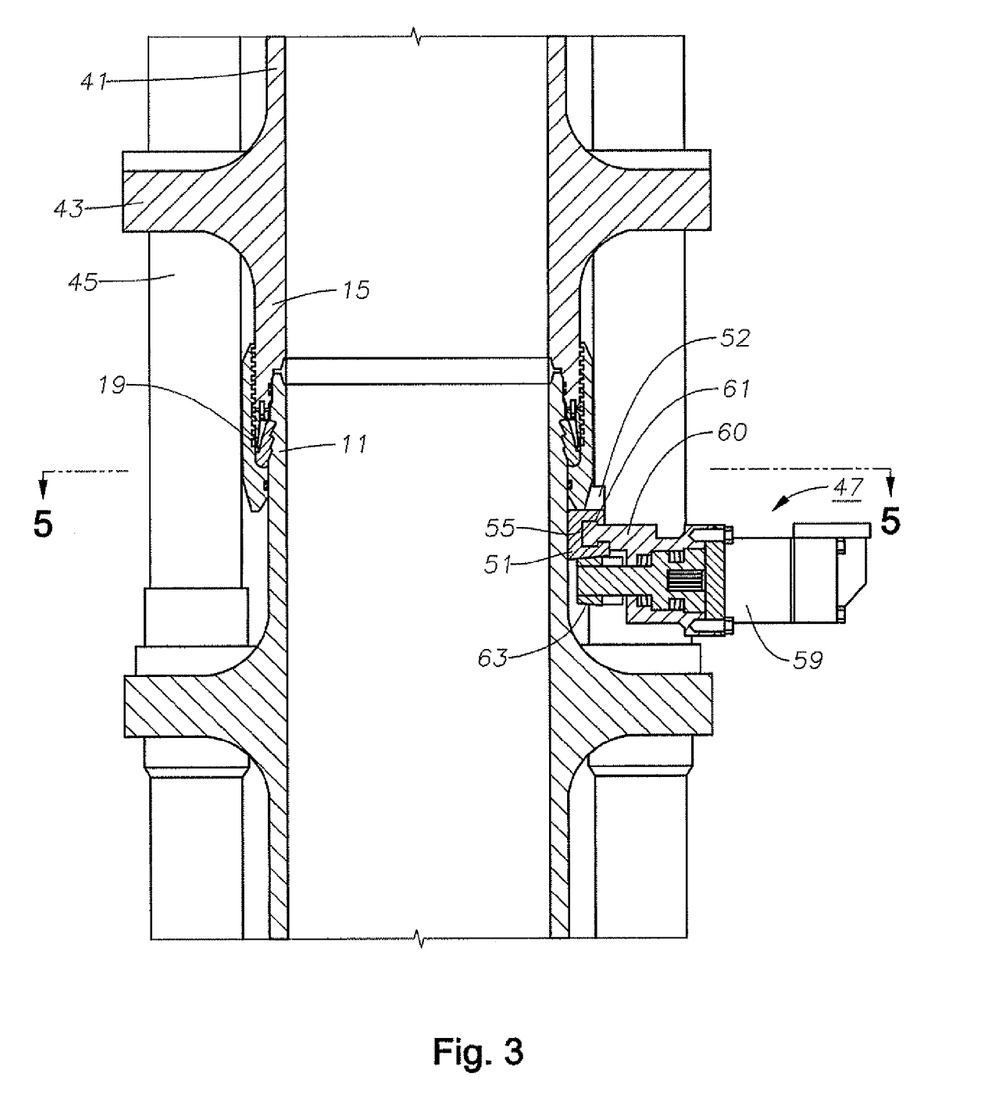
FIG. 3 is a sectional view illustrating the connector of FIG. 1 incorporated within a drilling riser and showing a torque tool for making up and breaking out the connector.
Figure 5:
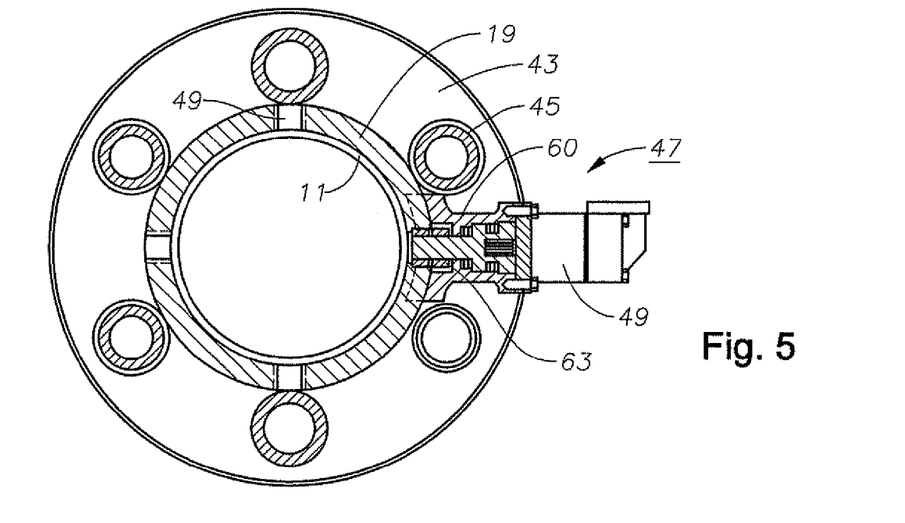
FIG. 5 is a sectional view of the connector and torque tool of FIG. 3, taken along the line 5-5 of FIG. 3.

Referring to FIG. 3, pin 11 and box 15 are shown incorporated as mating parts of two drilling riser sections 41. In this embodiment, each riser section 41 has a pin 11 on its upper end and a box 15 on its lower end. Each riser section 41 has an external flange 43 located near each end. Auxiliary lines 45 are spaced around the tubular riser 41 to provide hydraulic fluid pressure to a downhole marine riser package, and also for fluid flow during well completion. As shown in FIG. 5, in this embodiment, there are six auxiliary lines 45, although this number can vary. Auxiliary lines 45 locate within receptacles in flanges 43 so that they stab and make up automatically when pin and box 11, 15 make up.

Figure 6:
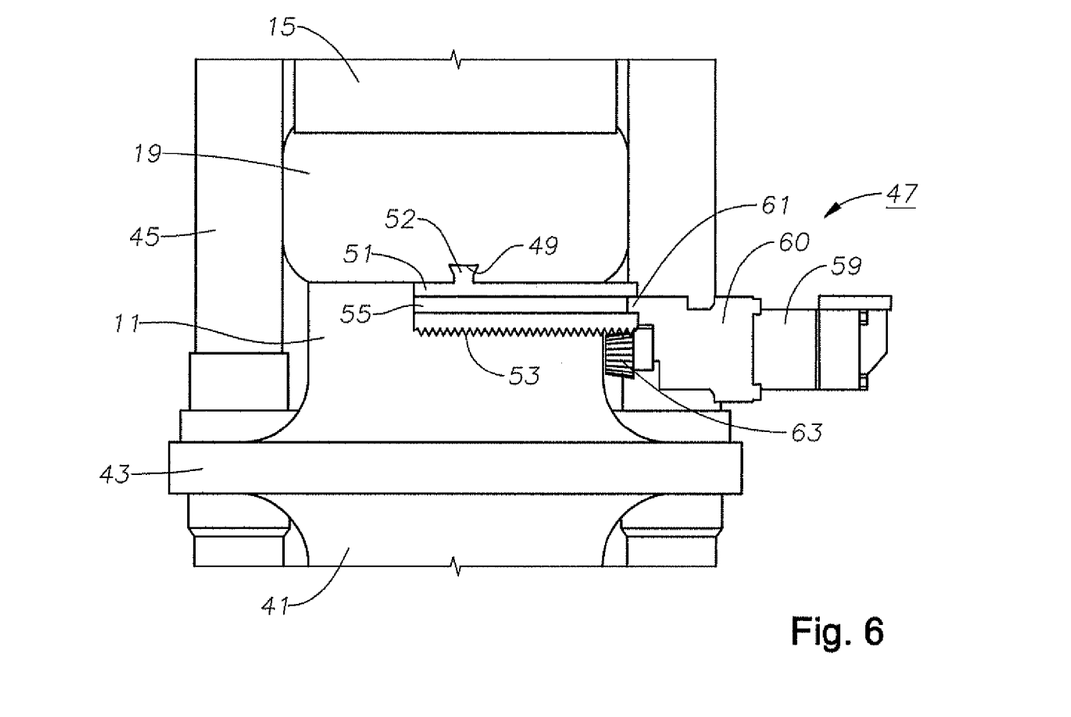
FIG. 6 is a side elevational view of the connector and torque tool of FIG. 3, with some of the auxiliary lines of the riser removed.
Figure 7:
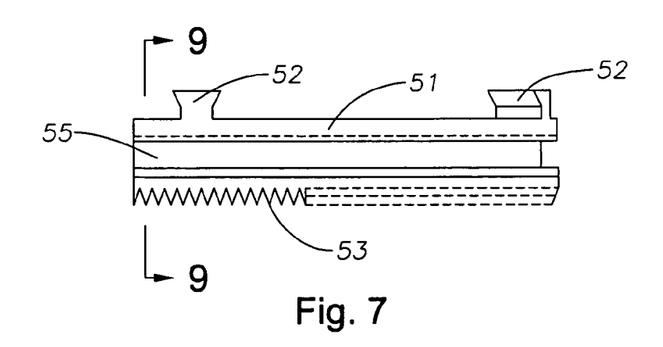
FIG. 7 is a side elevational view of a gear rack of the torque tool of FIG. 3.
Figure 8:
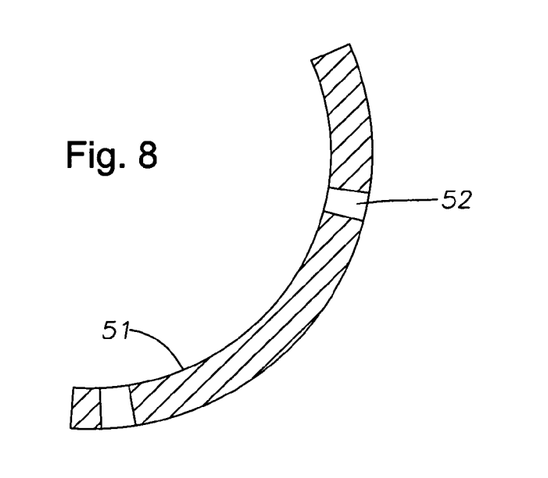
FIG. 8 is a top view of the gear rack of FIG. 7.
Figure 9:
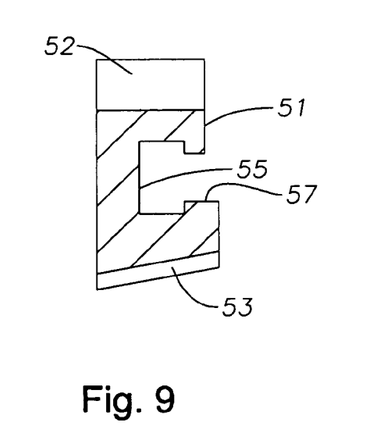
FIG. 9 is a sectional view of the gear rack of FIG. 7 taken along the line 9-9 of FIG. 7.

A powered torque tool 47 engages and rotates connector sleeve 19. Torque tool 47 fits between two of the auxiliary lines 45 as illustrated in FIG. 5. Referring to FIG. 6, which is an elevational view in reduced scale of a portion of the drilling riser assembly as shown in FIG. 3, each connector sleeve 19 has a plurality of dovetail slots 49 (only one shown in FIG. 6) formed in its lower edge and spaced apart from each other for engagement by a portion of torque tool 47. A rack gear 51 is adapted to slide into engagement with the lower edge of connector sleeve 19. Rack 51 has gear teeth that face generally downward in this embodiment. Rack gear 51 has a pair of spaced-apart lugs 52 (FIG. 7) on its upper side, each lug 52 sliding into engagement with one of the dovetail slots 49. Rack gear 51 is curved at the same radius as connector sleeve 19, but extends circumferentially only a partial distance, less than 180 degrees. In this embodiment, rack gear 51 extends about 110 degrees, enabling it to be inserted between two of the auxiliary lines 45 (FIG. 3) by first orienting it vertically, then horizontally. Rack gear 51 has a set of gear teeth 53 on its lower side. Also, rack gear 51 has an outer wall receptacle or slot 55 formed in its outer wall and extending the length of rack gear 51. As shown in FIG. 9, slot 55 is generally rectangular in this embodiment and has lips 57 extending toward each other, creating a general "C" shaped configuration in cross-section.

Figure 4:
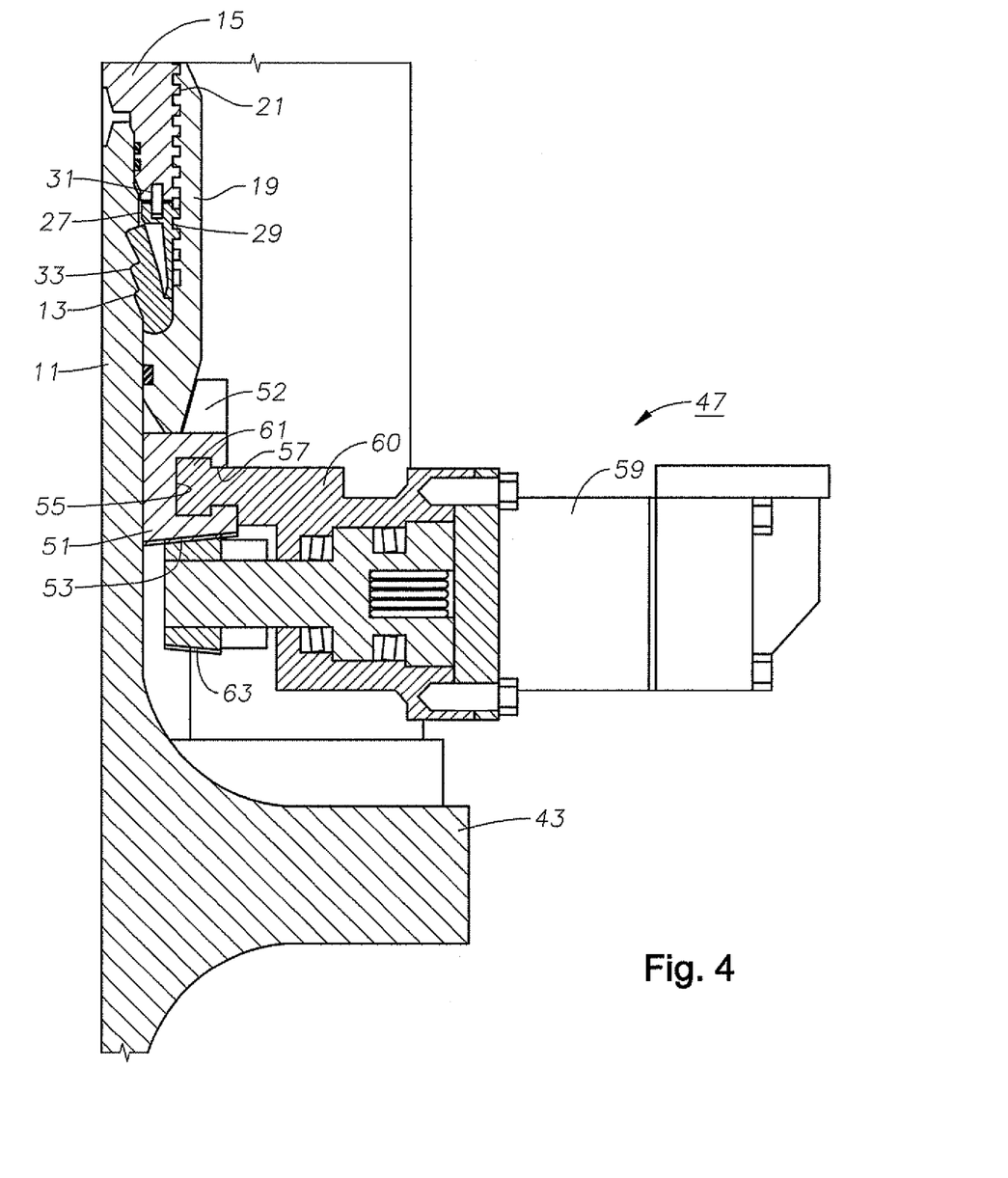
FIG. 4 is an enlarged sectional view of a portion of the connector and torque tool of FIG. 3.

Referring to FIG. 4, torque tool 47 includes a motor 59, which is preferably either pneumatic or hydraulic. An adapter 60 is coupled to the forward end of motor 59. Adapter 60 has a retainer 61 formed on its inner or free edge. Retainer 61 has the same configuration as rack gear slot 55. Retainer 61 can be inserted into rack gear slot 55 from one of the sides of rack gear 51. Motor 59 has a pinion gear 63 that engages teeth 53. When motor 59 is actuated and held stationary, pinion gear 63 will rotate and cause connector sleeve 19 to rotate in unison with it.

In operation, referring to FIG. 3, while a lower section of riser 41 is suspended at the rig floor, the operator lowers an upper section of riser 41. While lowering the upper section, lock ring 33 will be in the unlocked position of FIG. 1. After landing, the operator installs lugs 52 of rack gear 51 into dovetail slots 49 (FIG. 6). An inner side of rack gear 51 will be in contact with an outer surface of pin member 11 below connector sleeve 19. The operator then secures torque tool 47 to rack gear 51 by engaging retainer 61 with slot 55 of rack gear 51, as shown in FIG. 4. Lips 57 engage outward-facing shoulders on retainer 61 to support torque tool 47 in cantilever fashion. The weight of torque tool 47 transfers to connector sleeve 19 through lugs 52.

The operator then causes pinion gear 63 to rotate, which in turn causes rack gear 51 and connector sleeve 19 to rotate. Because of the difference in pitch of threads 21 and 29, retainer ring 27 will move upward faster than connector sleeve 19, freeing lock ring 33 to pivot outward to the locked position of FIG. 2. Continued rotation preloads the connection. The operator then removes torque tool 47 and rack gear 51.

The operator can disconnect riser sections 41 (FIG. 3) from each other by reversing the above-described procedure. Torque tool 47 and rack gear 51 can be used to rotate rings or sleeve for other types of connectors than the connector shown and described.

The invention has significant advantages. The power tool and rack gear can more quickly make-up and break-out riser joints faster than prior art riser connectors, which use riser bolts or dogs actuated by screws. The power tool and rack gear engage each connector only one time to make-up or break-out the connection, instead of having to engage a number of different screws or bolts at each joint. The system could be used with tubular members other than drilling riser strings.

While the invention has been shown in only one of its forms, it should be apparent to those skilled in the art that it is not so limited but is susceptible to various changes without departing from the scope of the invention. For example, the rotational connector sleeve could actuate the connection in different ways than shown. The rotation of the connector sleeve could cause a ramp surface to move a dog-type element or latch member radially inward to engage a grooved profile. Rather than support the power tool with the connector sleeve in a cantilever arrangement, the power tool could be mounted to a carriage that moves inward and outward. The slot and lug arrangement for engaging the rack with the connector sleeve could be changed to a frictional pad on the rack that engages the connector sleeve.

The invention claimed is:

1. A connection system for a tubular string, comprising:
    first and second tubular members;
    a connector sleeve mounted to an end of the second tubular member, the connector sleeve having a connector sleeve axis and being rotatable about the connector sleeve axis relative to the second the tubular member, the connector sleeve being connectable to the first tubular member in response to rotation of the connector sleeve about the connector sleeve axis relative to the first tubular member for securing the tubular members to each other;
    a curved rack of gear teeth, the rack being engagable with the connector sleeve for causing rotation of the connector sleeve in unison with the rack while the rack is engaged with the connector sleeve, the rack extending less than 180 degrees around the connector sleeve;

the rack having a receptacle that extends along a length of the rack from one end to another end of the rack;

a power tool that rotates a drive shaft;

a gear mounted to the drive shaft in engagement with the gear teeth of the rack to cause the rack to move in a rotational direction about the connector sleeve axis when the drive shaft is rotated, causing the connector sleeve to rotate about the connector sleeve axis relative to the first and second tubular members to secure the first and second tubular members together;

a retainer extending from the power tool into the receptacle, the rack being slidable relative to the retainer when the gear rotates; and the rack being detachable from the connector sleeve while the first and second tubular members remain secured together.

2. The system according to claim 1, wherein:
the rack has a radius formed about a center point that coincides with the connector sleeve axis while the rack engages the connector sleeve.

3. The system according to claim 1, wherein the gear teeth of the rack are located on a surface of the rack that faces generally in an axial direction relative to the connector sleeve axis.

4. The system according to claim 1, wherein the connector sleeve and the rack have a lug and slot arrangement that releasably attach the rack to the connector sleeve.

5. The system according to claim 1, wherein:
the connector sleeve has at least one slot formed therein; and
the rack has at least one lug that engages the slot to releasably retain the rack with the connector sleeve.

6. The system according to claim 1, wherein:
the receptacle has a lip engaged by the retainer, the lip supporting a weight of the power tool.

7. The system according to claim 1, further comprising:
a locking element in engagement with an inner portion of the connector sleeve, the locking element having at least a portion that moves radially inward relative to the connector sleeve in response to the rotation of the connector sleeve relative to the locking element for engaging a profile on the first tubular member to make up the tubular members to each other.

8. The system according to claim 1, wherein the gear teeth face generally in an axial direction relative to the connector sleeve axis.

9. A connection system for a tubular string, comprising:
first and second tubular members;
a connector having mating components on ends of the first and second tubular members for securing the first and second tubular members to each other;
one of the mating components comprising a connector sleeve having an axis and securable to the first tubular member in response to rotation of the connector sleeve about the axis relative to the first tubular member and to the second tubular member, the connector sleeve having an inner side containing a set of internal threads;
the other of the mating components comprising a set of external threads formed on the second tubular member, the internal threads of the connector sleeve engaging the external threads of the second tubular member;
a rack of gear teeth, the rack being curved about the axis of the connector sleeve;
engagement means for releasably coupling the rack to the connector sleeve;

a power tool having a drive motor that rotates a drive shaft; and a gear mounted to the drive shaft and in engagement with the gear teeth of the rack to cause the rack to move in a rotational direction when the drive shaft is rotated, thereby rotating the connector sleeve to secure the first and second tubular members to each other; and a retainer for releasably connecting the power tool to the rack such that the rack is slidable relative to the power tool when the gear is rotating;

a locking element in engagement with the inner side of the connector sleeve, the locking element having at least a portion that moves radially inward in response to the rotation of the connector sleeve relative to the locking element for engaging a profile on the first tubular member.

10. The system according to claim 9, wherein:
the connector sleeve has a radially outward facing sidewall; and the engagement means comprises:
a plurality of circumferentially spaced-apart slots in the sidewall of the connector sleeve; and
a plurality of lugs spaced apart along a length of the rack for sliding into the slots.

11. The system according to claim 9, wherein the rack extends no more than 180 degrees.

12. A connection system for a tubular string, comprising:
first and second tubular members;
a connector having mating components on ends of the first and second tubular members for securing the first and second tubular members to each other;
one of the mating components comprising a connector sleeve having an axis and securable to the first tubular member in response to rotation of the connector sleeve about the axis relative to the first tubular member, the connector sleeve having an inner side containing a set of internal threads;
the other of the mating components comprising a set of external threads formed on the second tubular member, the internal threads of the connector sleeve engaging the external threads of the second tubular member;
a rack of gear teeth, the rack being curved about the axis of the connector sleeve;
an engagement arrangement for releasably coupling the rack to the connector sleeve;
a power tool having a drive motor that rotates a drive shaft; and
a gear mounted to the drive shaft and in engagement with the gear teeth of the rack to cause the rack to move in a rotational direction when the drive shaft is rotated, thereby rotating the connector sleeve to secure the first and second tubular members to each other; and
a retainer arrangement between the power tool and the rack to connect the power tool to the rack, the rack being slidable relative to power tool when the gear is rotating;
wherein the rack extends less than 180 degrees around the connector sleeve, and the retainer arrangement comprises:
the rack having a receptacle extending along a length of the rack from one end to another end of the rack, the receptacle having an elongated opening that faces radially outward and a lip adjacent the opening and facing radially inward; and
an adapter mounted to the power tool and extending radially inward therefrom alongside the drive shaft, the adapter having a portion that fits within the elongated opening of the receptacle, the adapter having an inner end closely received within the receptacle and having a radially outward-facing shoulder that engages the lip.

13. A connection system for a tubular string, comprising:

first and second tubular members;

a connector having mating components on ends of the first and second tubular members for securing the first and second tubular members to each other;

one of the mating components comprising a connector sleeve having an axis and securable to the first tubular member in response to rotation of the connector sleeve about the axis relative to the first tubular member, the connector sleeve having an inner side containing a set of internal threads;

the other of the mating components comprising a set of external threads formed on the second tubular member, the internal threads of the connector sleeve engaging the external threads of the second tubular member;

a rack of gear teeth, the rack being curved about the axis of the connector sleeve;

an engagement arrangement for releasably coupling the rack to the connector sleeve;

a power tool having a drive motor that rotates a drive shaft; and a gear mounted to the drive shaft and in engagement with the gear teeth of the rack to cause the rack to move in a rotational direction when the drive shaft is rotated, thereby rotating the connector sleeve to secure the first and second tubular members to each other;

a retainer arrangement between the power tool and the rack to connect the power tool to the rack, the rack being slidable relative to power tool when the gear is rotating; and wherein the engagement arrangement positions a radially inward facing surface of the rack in contact with the first tubular member;

the retainer arrangement comprising the rack having a receptacle extending along a length of the rack from one end to another end of the rack, an adapter mounted to the power tool and extending radially inward therefrom alongside the drive shaft, and the adapter having a portion that fits within the elongated opening of the receptacle.

* * * * *